Patented Dec. 30, 1947

2,433,348

UNITED STATES PATENT OFFICE 2,433,348

METHOD OF PROCESSING FOODSTUFFS

John C. Donnelly, Greenwich, Conn.

No Drawing. Application May 18, 1943,
Serial No. 487,495

2 Claims. (Cl. 99—192)

The invention relates to certain new and useful improvements in foodstuffs and in the art of processing foodstuffs.

Objects and advantages of the invention will be set forth in part hereinafter and in part will be obvious herefrom, or may be learned by practice with the invention, the same being realized and attained by means of the steps, methods, and articles of manufacture pointed out in the appended claims.

The invention consists in the novel steps, methods, procedures, articles and improvements herein described.

Foodstuffs, whether of animal or vegetable origin, are generally characterized by a high ratio of liquids to solids. For example, potatoes ordinarily average around eighty percent liquid to twenty percent solid. The transportation of foodstuffs of this nature is uneconomic, firstly, because the liquid content represents an appreciable mass of material to be needlessly handled; and secondly, because the bulk of the material is high and the quantity which can be shipped in a given cargo space is therefore limited.

Dehydration of such foodstuffs to a state wherein the liquid content is in the order of two or three percent or less represents a material forward step. Reduction in both weight and volume and preservation of the foodstuff is thereby achieved.

Considerations of economy particularly call for the greatest possible reduction in the volume or bulk of such foodstuffs in order that the optimum use may be made of available transportation space and a maximum quantity of foodstuffs may be transported therein.

Objects of the present invention are to provide a new and useful method of processing foodstuffs to the end that a materially greater quantity of foodstuffs may be transported in a given shipping space, that materials which would otherwise be required for ships, freight cars and other transportation units in the transport of the foodstuffs may be diverted to other useful purposes; that material economies may be effected in the cost of packaging foodstuffs for transportation, storage and display; that handling and more rapid packaging of foodstuffs may be facilitated; that production costs may be reduced through the elimination of expensive agitating equipment; that the normal hygroscopic nature of foodstuffs may be offset thereby to minimize the undesired absorption of water by such foodstuffs; that deterioration of foodstuffs through the operation of natural processes may be delayed and the time element of "staling" and "shelf life" thereby extended; that the extraction of nutritive constituents from foodstuffs through the employment of water or other liquid extraction mediums and the dissolution of foodstuffs in such mediums may be facilitated and improved; that the problem of the quantity of foodstuffs required for one or more persons per meal may be simplified through the provision of unit packages containing servings for one, two, four or six or more persons; and that these ends may be acomplished without material loss or impairment of vitamins and other constituents of nutritive value present in the foodstuffs or loss of flavor, taste, calorific value or color; to provide a method of processing foodstuffs so as to reduce their volume, that is, bulk without expressing or losing valuable fats, oils or other low melting point constituents of the foodstuffs and without concomitant "burning" or discoloration of the foodstuffs; to provide a method of debulking dehydrated foodstuffs of low moisture content without converting a high percentage of the foodstuffs to powder or losing a part of the foodstuffs; to provide a method of debulking dehydrated foodstuffs without increasing the normal reconstitution time of the foodstuff in its dehydrated state or impairing its normal appearance when reconstituted; to provide as a new and useful article of manufacture a unit of compressed foodstuff that will withstand moderate handling but is sufficiently friable to permit ready use; and, to provide a new and improved method for processing meat to the end that its tenderness may be improved and uniform packaging may be facilitated.

To the accomplishment of the foregoing ends and objects, the foodstuff is preferably first dehydrated and then is refrigerated to a temperature of, for example, from about 32° F. to about —45° F. at which the foodstuff as a whole and the constituents of which it is formed are and will remain substantially non-fluid at the maximum compressing or debulking pressure to which the foodstuff is thereafter to be made subject.

It will be understood that foodstuffs vary widely in their content of fats, oils, water soluble vitamins, sugars, starches and the like. These valuable nutritive constituents, if not already in a fluid or semi-fluid state at normal temperatures, would be fluidized and expressed from the foodstuff were it subjected to even moderate pressures at these temperatures. Accordingly and in accordance with this invention the foodstuff is initially refrigerated so that these constituents, and the foodstuff as a whole, will be non-fluid and will not be fluidized at the compression pressures to which it is to be made subject.

The foodstuff may be in the form of a coarse or fine powder, or of shreds or flakes or of large or small particles or pieces. In general, the form will be determined by the processing, if any, which the foodstuff has previously undergone. For example, the foodstuff may be in its natural state or it may have been processed, by commercially known dehydrating, drying or cooking processes to a semi-dry or substantially dry state. Illustrative examples of dehydrated foodstuffs which may be processed according to this invention are: dehydrated natural fibrous cellular products, for example, dehydrated vegetables including soy beans, peas, peanuts and other legumes, beets, potatoes, carrots, onions and other tubers, cabbage and other leafy vegetables, cranberries, dehydrated fruits such as tomatoes, apples, raisins and oranges, dehydrated cereal grains, such as wheat, oats and corn, dehydrated mixed seasoned and unseasoned vegetables, dehydrated nuts such as coconuts, and walnuts, and dehydrated meats such as beef, pork, lamb and fish; dehydrated non-fibrous cellular products, for example, dairy products such as whole milk powder, skim milk powder, and powdered egg yolks, and powdered whole eggs; dehydrated extracts or blends of meats, vegetables and the like, for example, beef extract seasoned with vegetables; and, dehydrated synthetic mixtures resulting from a combination of certain of the foregoing products or other products or parts thereof with each other, for example, ice cream mixes, field rations, soup mixes, potato chips and dehydrated pastry preparations such as ready-mixed cake, pie-crust, muffin and similar bake-goods preparations.

The foodstuff in its refrigerated state if not already in small pieces, particles, flakes or powdered form is broken up and placed in a mold of suitable shape wherein it is subjected, as by means of a hydraulic ram, to a uniformly distributed powerful pressure sufficient to effect a material reduction in volume of the foodstuff and to compress, consolidate and bind the foodstuff into a compact friable integrated unit or block of substantial density. This unit packet or block is capable of being subjected to moderate handling and packaging operations, without disintegrating, following its removal from the mold and while it is still in a refrigerated state.

The pressure to which the foodstuff is subjected is preferably one which will effect a maximum reduction in volume of the foodstuff consistent with the obtainment of a readily friable integrated unit as distinguished from a corneous unit which is not capable of being readily reconstituted so as to be rendered edible.

Numerous tests show that there is a range of pressures for each foodstuff within which, from a practical viewpoint, binding of the particles of foodstuff to each other is initiated and proceeds sufficiently to transform the foodstuff from its initial relatively bulky state into an integrated readily friable unit capable of being subjected to moderate handling and packaging operations immediately following its removal from the mold. This pressure range is for convenience sometimes hereinafter referred to as the "binding range" and the pressure at which this effect is realized is sometimes hereinafter referred to as the "binding pressure." The binding pressure, depending upon the foodstuff, will generally lie within the range of from about 300 pounds per square inch to about 5000 pounds per square inch.

The upper limit of the binding range is characterized by a pressure, hereinafter sometimes referred to as the "critical pressure," above which binding of the particles of foodstuff to each other proceeds to such an extent as to transform the foodstuff into a dense, hard block of marble-like consistency and characteristics. It is therefore preferable to employ a pressure lower than the critical pressure, but within the binding range. Such a pressure has the decided advantage that it not only produces a readily friable integrated unit of the foodstuff in a useful state but it effects the optimum economic reduction in volume of the foodstuff. Higher pressures have the added disadvantage that they will effect no further substantial change in volume.

The critical pressure for any given foodstuff may be controlled to some degree by varying the rate of application of the compressing force. Thus, the more rapid the application of the compressing force, the lower the pressure at which "setting," marblizing," "cornification" or "tiling" of the foodstuff will occur. Conversely, a slow application of the compressing force has the opposite effect. The rate of application has a similar effect on the binding pressure.

The effect of temperature on the critical pressure and on the binding pressure is opposite to that of the rate of application of the compressing force. Thus, the lower the temperature of the foodstuff being compressed, the higher will be the pressure to which the foodstuff can be subjected before binding and subsequent setting or cornification occurs. In consequence, the foodstuff should be refrigerated to a temperature which will insure the obtainment of the optimum economic reduction in volume of the foodstuff consistent with the obtainment of a unit of desired friability and handling and packaging characteristics. Preferably this temperature is also one at which the foodstuff will not undergo any material or substantial change in its structure as it is compressed. If the temperature is lowered substantially more than is necessary to prevent fluidizing of the low melting point constituents, the foodstuff particles will fractionate and be disrupted under the binding pressure. In consequence, the foodstuff will be converted to a powder of a fineness dependent upon the magnitude of the binding pressure applied. Although such fractionating is not necessarily objectionable from the standpoint of producing a friable integrated unit packet, the foodstuff upon again reaching a normal temperature will not possess its normal structure and appearance and hence may have less commercial utility than if fractionating had not occurred. For example, a sample of dehydrated raisins having approximately a 15% moisture content retained substantially their original appearance and structure after compression and debulking into a satisfactory integrated friable unit at a temperature of +10° F. and a binding pressure of 750 pounds per square inch. In contrast thereto, however, raisins of the same sample, compressed at the same pressure but at a substantially lower temperature, namely —30° F., fractionated into a powder under these conditions, notwithstanding that an integrated unit satisfactory in all other aspects is produced.

In general, the lower the moisture and fat content of a foodstuff, in the form of flakes or chunks, the higher the refrigeration temperature must be in order that fractionation may be avoided, if objectionable for any reason. However, the higher the content of fats, and readily fluidized constituents, the lower the refrigeration temperature must be in order that these constituents will not be expressed during the debulking of the foodstuffs.

In general, high fat content of the foodstuff and low temperature go hand in hand. Powdered dehydrated foodstuffs of high fat content obviously present no fractionation problem. Of these, powdered soup mixes, onion, soya bean, egg, whole milk and ice cream powder and synthetic preparations such as whole wheat flour to which fats and ground meat have been added, are typical. They may have a fat content running as high as 30% and a moisture content in the order of 2% to 4%.

It is in connection with the flake, chip and chunk form of dehydrated foodstuff of low fat and moisture content that the fractionation problem arises and their refrigeration should be accomplished preferably with the object of preserving their normal structure at the binding pressure. By so doing they may be reconstituted in water at normal temperatures so as to possess their normal appearance. Thus, for example, cranberries may be compressed in accordance with this invention and yet be capable of returning rapidly to their normal appearance upon soaking in water for a short time.

With foodstuffs very low in both fat and moisture content but high in sugars such as dehydrated cabbage, kale, onions and sauerkraut in flake form and having a moisture content in the order of 3% to 5%, it may be necessary for the prevention of fractionation to increase the moisture content before refrigeration to around 6%-7% for example.

Various theories may be offered to explain the nature of the changes which occur in the physical state of the foodstuff during compression. The validity of any such theory is not admitted nor is the expression of any such theory herein intended as a limitation upon the nature of this invention or upon the scope of the appended claims. It appears plausible, however, that the heat generated within a non-refrigerated foodstuff during compression effects a temperature rise sufficient in some instances to liquify certain of the low melting point constituents of the foodstuffs and to alter the physical and chemical nature of the constituents as by cooking to the detriment of the color, taste, flavor, vitamin content and nutritive value of the foodstuff. Liquified constituents expressed coat both the foodstuff and the mold and congeal or set under the high pressure and resultant temperature. These changes are substantially prevented by refrigeration of the foodstuff before compression so that such temperature rise as does occur during compression below the "critical" pressure will leave the foodstuff at a temperature below that at which these changes normally take place.

The configuration of the mold in which the foodstuff is compressed is preferably such that the total change in volume of the foodstuff is effected with the minimum length of stroke of the hydraulic ram or piston by which the compressing force is applied consistent with the production of the desired usable cake. As a guide to the accomplishment of this, the major dimension of the integrated unit may be selected so as to be greater than the length of the stroke. In this way "burning" and resultant discoloration of the foodstuff during compression is minimized since the foodstuff has a smaller distance through which it must move in being transformed from the uncompressed to the compressed state. Frictional burning through rubbing on the mold walls is therefore minimized.

In other words, it is preferable to compress the foodstuff into a thin tablet of relatively large total surface area than into a thick tablet of the same total surface area.

After the foodstuff is compressed, the pressure is released, the integrated unit is removed from the mold and while still at a low temperature is preferably hermetically sealed in a suitable wrapper. The wrapper is preferably of a waterproof nature so that absorption of moisture, swelling and rupturing of the unit will be minimized and the unit will be placed in a form suitable for packing in cartons for shipment. Various types of wrapping material are suitable for the purpose. For example, waxed paper, transparent films of moisture-proof cellulose sheeting such as commercial Cellophane or cellulose acetate may be utilized since they may be heat sealed; likewise commercial Pliofilm and other moisture-proof wrapping materials, including laminated wrapping material capable of being heat sealed, such as, Pliofilm laminated with asphalt-impregnated paper, may be employed.

The processing, in accordance with this invention, of certain foodstuffs may be facilitated by increasing the moisture content of the foodstuff prior to refrigeration. Certain of the so-called breakfast foods, such as, for example, Grape-Nuts and Corn Flakes, fall within this category. These have a moisture content of around 1% to 4% as commercially produced. This moisture content may be increased to around 6% or 7% before they lose their crispness and become soggy. Such foodstuffs tend to "powder" under the high pressures employed and this powdering may be avoided if deemed objectionable by spraying the foodstuff with moisture or by subjecting the foodstuff before compression to an atmosphere sufficiently humid to raise the moisture content of the foodstuff slightly, say to three or four percent, for example. The moisture thus deposited on the surface of the foodstuff in this way provides a binding medium which upon refrigeration to a temperature below the freezing point of water, followed by compression enables the production of an integrated unit capable of being packaged while at the low temperature.

The following example is illustrative of the application of this invention to the processing of a dehydrated foodstuff.

One ounce of flaked unseasoned mixed-vegetables, in a commercially dehydrated state, was refrigerated to a temperature of approximately −20° F. and placed in the mold of a hydraulic press, the mold being two inches deep and having a rectangular cross-section of approximately two inches by two inches and being at approximately the same temperature. The mixed vegetables were then subjected to a uniformly distributed pressure of approximately six thousand pounds per square (that is, to a pressure of approximately six thousand pounds over the area of the two inch by two inch square) by means of the press piston or, converting to pounds per square inch, to a pressure of approximately 1500 lbs. per sq. in. At this pressure, the foodstuff was transformed into a compact integrated unit or block which upon release of the pressure, was removed from the mold. The integrated unit was found to be readily friable but capable of being subjected to moderate handling without rupture or crumbling. While still in its refrigerated condition the unit was enclosed in a moisture-proof Cellophane wrapper which was then heat sealed to itself thereby obtaining a compact moisture-proof commercially useful unit packet of small volume.

Other dehydrated foodstuffs were processed in a mold of the same dimensions and in the same manner, the relative characteristics of a number of such foodstuffs in their processed and unprocessed state being set forth in the following Table I:

*Table I*

| | Volume Reduction in Percent | Density, lbs. per cubic ft. | | Approximate Binding Pressure Range, lbs. per sq. inch | Approximate Critical Pressure, lbs. per sq. inch |
|---|---|---|---|---|---|
| | | Unprocessed | Processed | | |
| Mixed Vegetables (Flaked—Unseasoned) | 69 | 18 | 54 | 1,250–1,500 | 1,625 |
| Peas (Powdered) | 25 | 44 | 58 | 2,250–2,500 | 2,500+ |
| Whole Egg (Powdered) | 45 | 24 | 44 | 875–1,000 | 1,125 |
| Whole Milk (Powdered) | 22 | 25 | 31 | 875–1,000 | 1,125 |
| Tomatoes (Powdered) | 47 | 31 | 53 | 875–1,000 | 1,125 |
| Onions (Flaked) | 61 | 17 | 50 | 1,250–1,500 | 1,500+ |
| Potatoes | 72 | 15 | 55 | | |
| Mixed Vegetables (Flaked—Seasoned) | 40 | 22 | 54 | | |
| Soybeans (Powdered) | 40 | 35 | 57 | 1,250–1,500 | 1,500+ |
| Beets (Powdered) | 40 | 35 | 57 | | |

In further illustration of representative values of volume reduction, density change and approximate binding pressure and of temperature of the foodstuff at the start of compression reference may be had to the following Tables II and III wherein there is set forth typical data adduced in the successful processing of still other dehydrated foodstuffs in accordance with this invention.

*Table II*

| | Volume Reduction in Percent | Density, lbs. per cubic ft. | | Approximate Binding Pressure, lbs. per sq. inch | Approximate Processing Temperature Of Foodstuff |
|---|---|---|---|---|---|
| | | Uncompressed | Compressed | | |
| | | | | | °F. |
| Meat Loaf Base Mix | 45 | 36 | 68 | 5,000 | 26 |
| Soup Base Mix | 54 | 36 | 80 | 4,400 | −10 |
| Egg Powder | 50 | 35 | 71 | 967 | 15 |
| Eggnog Powder | 63 | 22 | 61 | 1,250 | 25 |
| Potato Chips | 71 | 18 | 62 | 300–1,000 | 15 |

*Table III*

| | Volume Reduction in Percent | Density, lbs. per cubic ft. | | Approximate Processing Temperature Of Foodstuff |
|---|---|---|---|---|
| | | Uncompressed | Compressed | |
| | | | | °F. |
| Fish Flakes | 72 | 16 | 57 | 0 |
| Carp | 67 | 20 | 60 | −3 |
| "Cero-Meat" | 54 | 33 | 72 | −20 |
| Chicken Fat | 33 | 42 | 64 | −20 |
| Ice Cream Mix | 47 | 30 | 58 | −20 |
| Ginger Bread Mix | 46 | 41 | 77 | 0 |
| Devil's Food Mix | 46 | 41 | 77 | 0 |

The initial refrigeration of the foodstuff not only minimizes expressing of fats, oils and other low melting point constituents during the compressing and integrating operation, but facilitates feeding of the foodstuff to the mold. This initial refrigeration is of particular benefit in the case of dehydrated foodstuffs such, for example, as raisins which at normal i. e., room temperatures, still possess sufficient surface adhesive properties as to cause them to adhere to chutes, hoppers and other portions of the conveying equipment. The refrigeration imparts free-flowing properties to such foodstuffs facilitating their transfer and handling between storage bin and mold and minimizing "clogging" of the feeding equipment. Similar beneficial results are obtained by the initial refrigeration of any powdered material which is to be transferred mechanically or manually through a chute or hopper to a processing station.

In the processing of powdered, dehydrated foodstuffs it may be found desirable to sift the powdered material before feeding it to the mold. By so doing, a more uniform particle size is obtained thus furthering the obtainment of a more uniform product. The operation is also of particular benefit in preventing "laminating" of the foodstuff during the compressing operation which may occur when sifting is not performed. Such laminating may be occasioned by the nature and magnitude of an electrostatic charge on the foodstuff particles, the sifting serving favorably to alter the same so as to correct and minimize this tendency.

The air or other gaseous fluids trapped under pressure within the foodstuff unit during compression may tend to cause "stratification" of the unit, that is, the formation of layers. This stratification may be prevented or at least substantially minimized by maintaining the unit under the compressing pressure for a short time after the desired volume reduction has been obtained, so that the trapped air may escape. In other words, by allowing a period of "dwell" before releasing the pressure. Alternatively, "dwell" may be achieved by a continuous slow application of the pressure or by applying the pressure in successive increments with a dwell period in between until the maximum desired pressure is reached. The provision of clearance between the punch and die also facilitates the escape of such air and the combination of "dwell" time and clearance is advantageous. However, since a loose fit between the punch (piston) and the die (mold) tends to promote the formation of an irregular edge on the foodstuff unit, the fit should be of sufficient closeness as to make such formation of negligible consequence and yet permit air to flow between the punch and die at a rate favorable to the prevention of "stratification" in the foodstuff unit. Additionally, and particularly where the pressure face of the piston is very smooth and in consequence imparts a correspondingly smooth surface to the opposed face of the foodstuff unit, it may be found desirable to coat the pressure face of the piston with a suitable oleaginous material, such as technical white oil commonly employed for medicinal purposes, so as to minimize "sticking" and adhesion of the foodstuff to the piston face.

In the application of this invention to the tenderizing and packaging of uncooked meat, such as chuck or flank beef, for example, the meat is refrigerated to solidify the liquid content and is then compressed to a binding pressure below its critical pressure. In this way, not only is the volume reduced materially, but the meat is actually transformed into an integrated friable non-corneous unit which at normal temperature will disintegrate into discrete particles which can be readily leeched or dissolved in water. While still at the low temperature, however, the unit retains its form so that it may be wrapped and packaged for storage under refrigeration pending use.

It will be understood that the process of this invention is particularly advantageous when carried out by means of high speed compressing and wrapping machinery capable of turning out the unit packages in mass production quantities. By such means, the full advantages of more rapid and economic production of the packets for encasement in shipping containers of suitable form is realized.

The present application is a continuation-in-part of my copending application Serial No. 434,049, filed March 10, 1942, which has become abandoned.

The invention in its broader aspects is not limited to the specific manufactures, steps and processes described but departures may be made therefrom within the scope of the accompanying claims without departing from the principles of the invention and without sacrificing its chief advantages.

What I claim is:

1. The method of processing a dehyrated foodstuff including the steps of refrigerating the foodstuff to a temperature between about 32° F. and —45° F. at which fats and similar low melting point constituents of the foodstuff will remain substantially solid under a powerful "binding" pressure but at which fractionation and disruption of the foodstuff under the "binding" pressure will not occur; subjecting the foodstuff while in its refrigerated state to a powerful "binding" pressure between about 300 pounds per square inch to about 5,000 pounds per square inch but sufficient only to compact the foodstuff and bind the foodstuff into a compact readily friable non-corneous integrated unit without material or substantial change in the structure of the foodstuff; and, sealing the integrated unit while in its refrigerated state in a moisture-proof wrapper.

2. The method of processing a dehydrated foodstuff including the steps of refrigerating the foodstuff to a temperature between about 32° F. and —45° F. at which fats and similar low melting point constituents of the foodstuff will remain substantially solid under a powerful "binding" pressure but at which fractionation and disruption of the foodstuff under the "binding" pressure will not occur; and, subjecting the foodstuff while in its refrigerated state to a powerful "binding" pressure between about 300 pounds per square inch to about 5,000 pounds per square inch but sufficient only to compact the foodstuff and bind the foodstuff into a compact readily friable non-corneous integrated unit without material or substantial change in the structure of the foodstuff.

JOHN C. DONNELLY.

REFERENCES CITED

The following references are of record in the file of this patent:

UNITED STATES PATENTS

| Number | Name | Date |
| --- | --- | --- |
| 1,586,893 | Gay | June 1, 1926 |
| 1,998,384 | Petitpas | Apr. 16, 1935 |
| 673,069 | Wiley | Apr. 30, 1901 |
| 2,190,151 | Hawkins | Feb. 13, 1940 |
| 2,196,080 | Reynoldson | Apr. 2, 1940 |
| 2,235,209 | Fletcher, Jr. | Mar. 18, 1941 |
| 1,950,763 | Walter | Mar. 13, 1934 |
| 2,235,315 | Donnelly | Mar. 18, 1941 |

FOREIGN PATENTS

| Number | Country | Date |
| --- | --- | --- |
| 2,422 | Great Britain | 1855 |